(12) United States Patent
Schiller

(10) Patent No.: US 11,864,497 B2
(45) Date of Patent: Jan. 9, 2024

(54) PRUNING APPARATUS

(71) Applicant: Cameron Schiller, Morgan (AU)

(72) Inventor: Cameron Schiller, Morgan (AU)

( * ) Notice: Subject to any disclaimer, the term of this patent is extended or adjusted under 35 U.S.C. 154(b) by 0 days.

(21) Appl. No.: 16/627,199

(22) PCT Filed: Jun. 15, 2018

(86) PCT No.: PCT/AU2018/050595
§ 371 (c)(1),
(2) Date: Dec. 27, 2019

(87) PCT Pub. No.: WO2019/000020
PCT Pub. Date: Jan. 3, 2019

(65) Prior Publication Data
US 2021/0092911 A1 Apr. 1, 2021

(30) Foreign Application Priority Data
Jun. 30, 2017 (AU) ................. 2017902532

(51) Int. Cl.
*A01G 3/04* (2006.01)
*A01G 3/08* (2006.01)
*A01G 17/02* (2006.01)

(52) U.S. Cl.
CPC ......... *A01G 17/026* (2013.01); *A01G 3/0408* (2013.01); *A01G 3/085* (2013.01); *A01G 17/023* (2013.01)

(58) Field of Classification Search
CPC ...... A01K 61/54; A01K 63/04; A01G 3/0408; A01G 3/0426; A01G 3/08; A01G 3/085;
(Continued)

(56) References Cited

U.S. PATENT DOCUMENTS 3,000,450 A * 9/1961 Jongeneel ............... A01B 41/04
172/94
4,733,525 A * 3/1988 Pellenc ................ A01G 3/0408
56/503
(Continued)

FOREIGN PATENT DOCUMENTS

| FR | 2723509 A1 | 2/1996 |
|----|-----------|--------|
| GB | 405732 A | 2/1934 |

OTHER PUBLICATIONS

Schiller, Cameron, International Search Report and Written Opinion, PCT/AU2018/050595, dated Oct. 12, 2018, 9 pgs.

*Primary Examiner* — David J Parsley
(74) *Attorney, Agent, or Firm* — Morgan, Lewis & Bockius LLP

(57) ABSTRACT

A vine or cane pruning apparatus, comprising a toothed wheel for guiding the pruning apparatus over vegetation in use, the wheel comprising a multiplicity of generally radially projecting teeth distributed about the periphery of the wheel for catching vegetation between gaps of the teeth, and wherein the wheel rotates by consequence of its engagement with the vegetation and vine or cane posts as the apparatus is driven along a row of vines or canes for pruning; and a driven rotary cutter mounted co-axially to the wheel for cutting vegetation caught between the teeth, the cutter being configured such that its effective cutting area falls within the diameter of the wheel.

15 Claims, 2 Drawing Sheets

(58) Field of Classification Search
CPC ...... A01G 3/06; A01G 17/023; A01G 17/026; A01D 43/00
USPC ........ 119/234, 243; 47/1.43, 4; 56/233, 234, 56/239; 172/105
See application file for complete search history.

(56) References Cited

U.S. PATENT DOCUMENTS

| | | | |
|---|---|---|---|
| 5,239,755 A | | 8/1993 | Kramer |
| 5,544,444 A | * | 8/1996 | Oldridge .............. A01G 3/0408 47/4 |
| 5,694,753 A | * | 12/1997 | Dellinger ................. A01G 3/08 56/234 |
| 5,737,908 A | | 4/1998 | Andelfinger |
| 5,791,129 A | * | 8/1998 | Pellenc ................ A01G 3/0408 56/15.1 |
| 6,523,337 B2 | * | 2/2003 | Spagnolo .............. A01G 17/02 56/15.5 |
| 6,634,162 B1 | * | 10/2003 | Andros ................. A01G 17/02 56/328.1 |
| 7,204,072 B2 | * | 4/2007 | Joy ...................... A01G 3/0408 56/233 |
| 8,230,671 B2 | * | 7/2012 | Pellenc ............... A01G 3/0408 56/235 |
| 9,247,691 B2 | * | 2/2016 | Andros ............... A01G 3/0408 |
| 2014/0124605 A1 | | 5/2014 | Dezé et al. |

\* cited by examiner

PRUNING APPARATUS

CROSS REFERENCE TO RELATED APPLICATIONS

This Application is a United States National Stage Application, filed pursuant to 35 U.S.C. § 371, of PCT Patent Application Serial No. PCT/AU2018/050595 filed on Jun. 15, 2018, which claims the benefit of and priority to Australian Patent Application No. 2017902532 filed on Jun. 30, 2017, each of which is hereby incorporated by reference in its respective entirety.

FIELD OF THE INVENTION

The invention generally relates to pruning of vines or canes, and more specifically to a pruning apparatus that is driven along a row of vines or canes for pruning.

BACKGROUND

Conventional vine or cane pruning machines are generally provided with rotary saw blades with associated motorised wheels for guiding the blades over the vegetation for pruning. A drawback with existing pruning machines is that the motorised wheels often push the vegetation away from the cutting blades and hence reduce the effectiveness of the machine. Additionally, conventional pruning machines with such motorised wheels can be rough on the vines or canes during the pruning process and may cause lasting damage to the vegetation; thereby, forcing such machines to travel at slower speeds of about 2 km/hr in order to reduce damaged caused to the vegetation. The roughness of the conventional pruning machines means that these machines have been used primarily for the pre-pruning process after which a more expensive manual pruning step is still required.

The applicant has determined that it would be advantageous to provide an improved pruning apparatus which reduced damage to the vegetation during use and which enhances the speed and efficiency of the mechanised vine or cane pruning process. The present invention, in its preferred embodiments, seeks to at least in part alleviate the above-identified problems or to provide the public with a useful choice.

SUMMARY OF THE INVENTION

According to an aspect of the invention, there is provided a vine or cane pruning apparatus, comprising a toothed wheel for guiding the pruning apparatus over vegetation in use, the wheel comprising a multiplicity of generally radially projecting teeth distributed about the periphery of the wheel for catching vegetation between gaps of the teeth, and wherein the wheel rotates by consequence of its engagement with the vegetation and vine or cane posts as the apparatus is driven along a row of vines or canes for pruning; and a driven rotary cutter mounted co-axially to the wheel for cutting vegetation caught between the teeth, the cutter being configured such that its effective cutting area falls within the diameter of the wheel.

In one embodiment, the apparatus further comprises a displaceable arm assembly for connecting the toothed wheel with a prime mover for driving the apparatus along a row of vines or canes for pruning such that the wheel, when mounted to a distal end of the arm assembly, is laterally moveable with respect to the prime mover.

Preferably, the arm assembly is provided with one or more actuation mechanism(s) configured such that the wheel can be actuated to move laterally with respect to the pruning apparatus in a forward and/or reverse direction(s).

Preferably, the arm assembly is provided with one or more suspension system(s) configured such that the mounted wheel is biased to return to a neutral position with respect to the prime mover from a deflected position after encountering resistance against vegetation and/or post obstacles in use.

Preferably, the arm assembly comprises a first arm and a second arm pivotably coupled to the first arm, and a suspension system coupled therebetween such that the first arm is laterally moveable between the biased neutral position and the deflected position.

Preferably, the arm assembly further comprises a third arm pivotably coupled to the second arm, and wherein a second suspension system is coupled therebetween such that the lateral movement of both the first arm and the second arm are effected when the wheel, when mounted to a distal end of the first arm, encounters vegetation and/or post obstacles in use for improved traction between the wheel and said obstacles when traversing said obstacles.

Preferably, the arm assembly is horizontally and vertically adjustable relative to the prime mover.

Preferably, the teeth of the wheel are configured to have with a length which range from about 6 cm to about 8 cm.

Preferably, the widest spacing between adjacent teeth of the wheel is configured to be about 2 cm to about 5 cm.

Preferably, the teeth are configured to be in an elongated shape with a rounded distal end for traversing vegetation and/or post obstacles.

Preferably, the rotary cutter in the form of an elongated cutting blade having cutting edges at and/or near opposite ends of the blade.

Preferably, the cutter is configured such that a tip end of its cutting edge extends between a root of the teeth and a tip end of the teeth.

Preferably, the cutter is mounted about 1 cm above the toothed wheel.

In one embodiment, the apparatus further comprises a second like driven rotary cutter mounted adjacent and below the toothed wheel for extending the pruning area of the apparatus.

In one embodiment, the apparatus further comprises a second like toothed wheel mounted co-axially below the first-defined toothed wheel for catching additional vegetation for cutting, wherein the second toothed wheel is configured with a reduced diameter with respect to the first-defined toothed wheel.

In one embodiment, the apparatus further comprises an agitator in the form of a rod driven in rotation located below the toothed wheel for agitating vegetation such that they move closer to the toothed wheel and the rotary cutter for pruning.

Preferably, the teeth of the toothed wheel are substantially rigid.

According to another aspect of the invention, there is provided a pruning apparatus as described above in combination with a prime mover for driving the apparatus along a row of vines or canes for pruning.

Further aspects of the present invention and further embodiments of the aspects described in the preceding paragraphs will become apparent from the following description.

While aspects of the pedestal assembly will be described below for use in combination with each other in the preferred embodiments of the present invention, it is to be understood by a skilled person that some aspects of the present invention are equally suitable for use as standalone inventions that can be individually incorporated into pedestals not described herein.

BRIEF DESCRIPTION OF DRAWINGS

The invention will now be described, by way of non-limiting example only, with reference to the accompanying drawings, in which.

DETAILED DESCRIPTION

Figure 1:
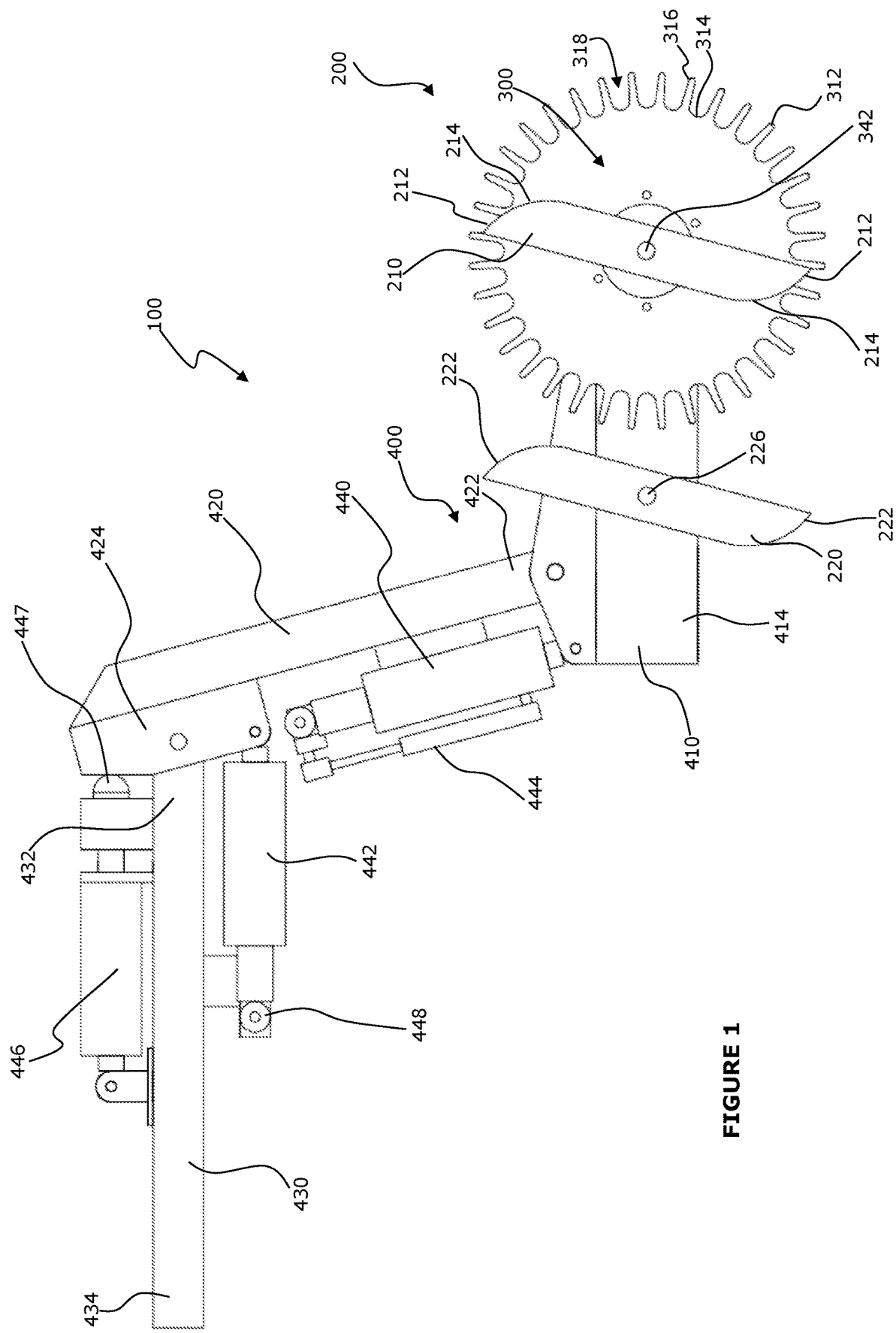
FIG. 1 is a plan schematic view of a pruning apparatus according to a preferred embodiment of the present invention.
Figure 2:
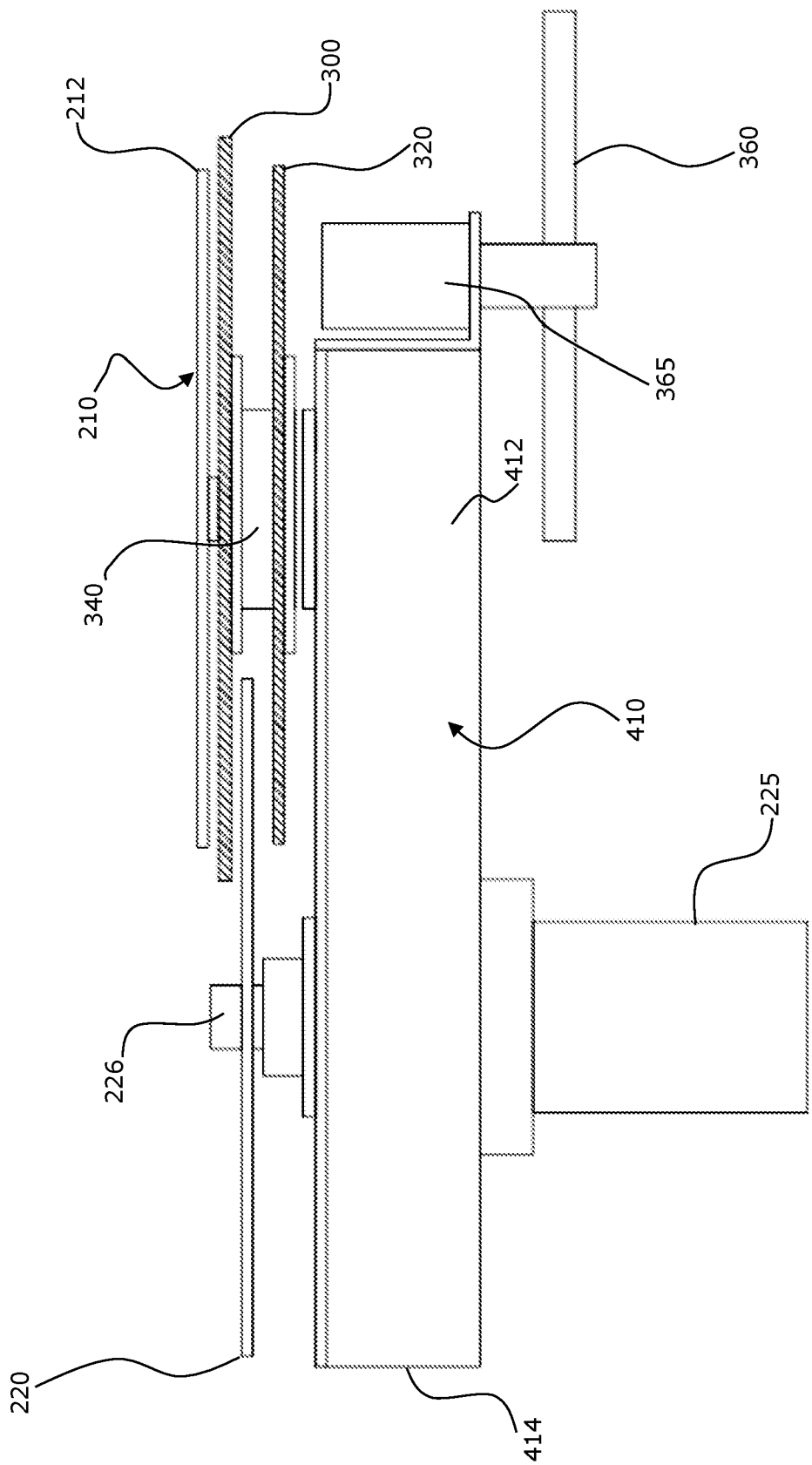
FIG. 2 is a side schematic view of an arm assembly of a pruning apparatus according to an embodiment of the present invention.

FIGS. 1 and 2 show schematically a vine or cane pruning apparatus 100 according to preferred embodiments of the present invention having a cutting assembly 200 mounted to a displaceable arm assembly 400. The pruning apparatus 100 is mountable to a prime mover (not shown) for driving the pruning apparatus 100 along a row of vines or canes for pruning.

Referring to FIG. 1, in one preferred embodiment of the invention, the cutting assembly 200 is provided with a toothed wheel 300 in the form of a cog having radially projecting teeth 312 distributed about the periphery of the wheel 300 and a driven cutter in the form of an elongated cutting blade 210 for pruning vegetation mounted co-axially to the toothed wheel 300. Vegetation caught in a gap 318 between the teeth 312 would be cut by the rotary cutting blade 210. The toothed wheel 300 is not driven, rather it rotates by consequence of its engagement with vine or cane vegetation in use. In one configuration, the teeth 312 are configured with an elongated shape with a rounded distal end 316. The toothed wheel 300, as configured, acts as a guide for the cutting assembly 200 by traversing over the vegetation to be pruned whilst allowing such vegetation to be caught between the gaps 318 defined between adjacent teeth 312 of the wheel 300. Advantageously, the teeth 312 of the toothed wheel 300 allow the wheel 300 to traverses/roll over the vegetation to the pruned while minimising damage to the underlying vegetation. This effect is further enhanced when the toothed wheel 300 is used in combination with the arm assembly 400 to be described later in the specification. Additionally, the toothed wheel 300 advantageously does not push vegetation away like conventional guides, rather, it facilitates the function of catching vegetation between the gap 318 for pruning by the rotary cutter 210.

Configuration of teeth 312 on the toothed wheel 300 such as the number of teeth and dimensional properties of the teeth depends on the vegetation to the pruned. A larger gap 318 between adjacent teeth 312 of the wheel 300 will allow thicker vines and canes to be pruned by the cutting blade 210, while a smaller gap 318 between teeth 312 of the wheel protects the cutting blade 210 from striking larger vegetation objects. For example, a gap 318 of 24 mm between adjacent teeth 312 would allow vegetation of about 19 mm in diameter to be caught within said gap 318 and subsequently cut by the rotary blade 210. In some configurations, the widest gap 318 between adjacent teeth 312 ranges from about 2 cm to about 5 cm. It is to be appreciated that other dimensions may also be suitable depending on the pruning application.

In some embodiments, the radial lengths of the teeth 312 (between a root 314 of the teeth and its tip end 316) together with the length of the cutting blade 210 also govern how closely the vegetation is pruned with respect to the vine or cane trunk/post. The cutting blade 210 length being left unchanged, longer teeth 312 configurations allow more vegetation to be caught within the gap 318 between adjacent teeth 312, while shorter teeth 312 configurations allow relatively fewer vegetation to be caught within the gap 318 between adjacent teeth 312 and hence vegetation is likely to be pruned closer to a trunk or post. In some configurations, the teeth 312 of the wheel 300 are configured to have with a length which range from about 6 cm to about 8 cm. It is to be appreciated that other dimensions may also be suitable depending on the pruning application.

The toothed wheel 300 can be in the form of a disc/plate constructed from high tensile steel. In an embodiment, the toothed wheel 300 is constructed from separate components or pieces so that it may be easier to assemble wheels 300 of larger diameters.

Referring to FIGS. 1 and 2, the driven rotary cutter 210 is mounted co-axially to the wheel 300 for cutting or pruning any vegetation that are caught or trapped between the teeth 312 of the wheel 300 (i.e. in the gap 318). In one embodiment, the cutter 210 has a reach within the diameter of the wheel 300 so that the blade is protected against striking objections that are thicker in length than the size of the teeth gap 318. The cutter 210 is configured such that a tip end 212 of its cutting edge 214 extends between a root 314 of the teeth 312 and a tip end 316 of the teeth 312. In this configuration, it can be said that the effective cutting or pruning area of the cutter 210 falls within the diameter of the wheel 300. In one configuration, the cutter 210 is powered by a motor (not shown) mounted to the apparatus 100 and is in the form of a rotary elongated cutting blade rotatable about axis 342 to which the wheel 300 is also mounted. The blade is configured to have cutting edges 214 at and/or near opposite ends of the blade. It is to be understood that in accordance with a preferred embodiment, the rotary cutter 210 blade is to be a low-torque high-speed blade as opposed to a high-torque low-speed rotary saw cutter utilised in conventional pruning devices.

In one embodiment, the rotary cutter 210 is co-axially mounted above the toothed wheel 300. In one configurations, the cutter is mounted about 1 cm above the wheel 300 to cut closer to the vegetation. It is to be appreciated that other dimensions may also be suitable depending on the pruning application. It is to be understood that vegetation which hang above or goes over the toothed wheel 300 will also be cut by the rotary cutter 210. The cutter 210 can be constructed from high tensile steel material. The cutter 210 can be driven by a motor or a suitable powering means mounted to the pruning apparatus 100.

The toothed wheel 300 and the driven rotary cutter 210 is mounted to a displaceable arm assembly 400 which is in turn mountable to a prime mover for driving the apparatus 100 along a row of vines or canes to be pruned. The arm assembly 400 mounting can be horizontally and vertically adjusted relative to the prime mover so that the cutting assembly 200 of the apparatus 100 could prune vegetation at any given height. It is to be appreciated that the arm assembly 400 and hence the pruning apparatus 100 can be configured to operate on a right-hand side or a left-hand side of the prime mover. The configuration as shown in FIG. 1 is for a right-hand side operation where the forward movement of the apparatus 100 is configured to travel in the direction indicated by the arrow, and a mirrored configuration can be used for a left-hand side operation.

In one embodiment, the displaceable arm assembly 400 is provided with a first arm 410, a second arm 420 pivotably coupled to the first arm 410, and a third arm in the form of a fixed boom 430 pivotably coupled to the second arm 420. The cutting assembly 200 which include the toothed wheel 300 and the rotary cutter 210 is mounted to a distal end 412 of the first arm 410. The arm assembly 400 is mountable to a prime mover such as a tractor at or near the proximate end 434 of the third arm 430. It is to be appreciated that the end 412 defines an end of the arm assembly 400 that is closest to the vegetation to be pruned when in use. The arm assembly 400 is mounted laterally extending to a prime mover and the pivoted coupling configuration above allows the first arm 410 and the second arm 420 to move laterally with respect to the prime mover when mounted.

The arm assembly 400 is provided with one or more suspension system(s) configured such that the first arm 410 and/or the second arm 420 and hence the mounted wheel 300 is/are biased to return to a neutral position with respect to the prime mover (such as a straight horizontally extended position) from a deflected position after encountering resistance against vegetation and/or post obstacles in use. In one configuration, the arm assembly 400 is provided with a suspension system 440 in the form of a shock absorber coupled between the first arm 410 and the second arm 420. This shock absorber 440 will bear the brunt of initial impact when the toothed wheel 300 mounted to the first arm 410 encounters resistance from hitting objects larger in diameter than the size of the teeth gap 318 of the toothed wheel 300 and bias the first arm 410 to return to the neutrally extended position from a deflected position after encountering any resistance.

In the preferred embodiment, the arm assembly 400 is further provided with a second suspension system 446 in the form of a shock absorber coupled between the second arm 420 and the third arm 430. This effectively provides a double-action movement of the arm assembly 400 against deflection of the arms 410, 420 in response to resistance encountered by the toothed wheel 300. Specifically, when the first suspension system 440 and the first arm 410 reaches a certain permitted tension/compression or length of travel, the second suspension system 446 will become engaged and as a result the second arm 420 will also move in response to accommodate a resistance or obstacle such as a trunk or post encountered by the toothed wheel 300 so that both arms 410, 420 could be retracted to allow improved traction between the toothed wheel 300 and said obstacle when the obstacle is being traversed. This arrangement effectively allows the toothed wheel 300 to "walk" over an obstacle rather than hitting or bouncing from it when the toothed wheel 300 is driven into the obstacle. Therefore, the pruning apparatus 100 causes less damage to the vegetation to be pruned and advantageously allows effective pruning action at speeds of about 5 km/hr rather than the lower 2 km/hr pruning speed achieved by conventional pruning apparatuses.

In some configurations, additional mechanisms could be included to control movement of the arm assembly 400. An adjustable stopper 447 can be located adjacent the second arm 420 and the third arm 430 to bear the returning force of the second arm 420 from a deflected position. Furthermore, an adjustable mount 448 can be added to the second suspension system 442 to preload any deflection in the second arm 420 and/or to increase tension to delay any movement in the second arm 420 in response to resistance encountered by the toothed wheel 300 mounted to the first arm 410.

Actuators can also be coupled to the arm assembly 400 so that the first arm 410 and the toothed wheel 300, and/or the second arm 420 can be actuated to move laterally with respect to a mounted prime mover in a forward and/or reverse direction(s). In one configuration, a reverse actuator is mounted between the first arm 410 and the second arm 420 as seen in FIG. 1 to allow the first arm 410 to be controlled and moved in a direction against its normal course of operation as shown (such moving the arm 410 up to 70° anti-clockwise). This reverse function advantageously provides the apparatus 100 with an ability to reverse the direction of pruning should the need arises—such as to cover a missed patch of vegetation or to prevent potential damage to the apparatus 100. This feature also allows the apparatus 100 to prune vegetation in the reverse motion without having to retract the toothed wheel 300.

A secondary actuator 446 can be added to the arm assembly 400, replacing the adjustable stopper 447, to control the movement of the second arm 420 with respect to the arm assembly 400. The secondary actuator 446 is configured to rotate the second arm 420 clockwise to pull the toothed wheel 300 away from vegetation and out of operation. It is to be appreciated that the actuators 444, 446 can be controlled manually or automatically.

In another embodiment, as seen in FIG. 2, the pruning apparatus 100 is provided with a second like driven rotary cutter 220 along the first arm 410 and positioned adjacent the first-described rotary cutter 210 and below the toothed wheel 300. The purpose of the second cutter 220 is to extend the cutting area of the apparatus 100 which is useful for pruning large canopies out of reach of the first cutter 210. It is to be appreciated that different blades could be used as the second rotary cutter 220 depending on pruning requirements. The second cutter 220 is also driven by a motor 225 mounted to the first arm 410.

The apparatus 100 can also be provided with a second toothed wheel 320 mounted co-axially below the first-described toothed wheel 300 for catching additional vegetation for cutting by inciting sideways bending/flexing movement of the vegetation and also advantageously provides the effect of shielding away any hard/metallic objects from the rotary cutter 210. The second toothed wheel 320 is provided with a diameter smaller than the first toothed wheel 300. In one configuration, the second toothed wheel 320 has a diameter larger than the first-described rotary cutter.

The apparatus can be further provided with an agitator 360 in the form of a rod driven in rotation located below the toothed wheel 300, 320 for agitating vegetation by introducing sideways bending/flexing movement of the vegetation such that the affected vegetation moves closer to the toothed wheel 300, 320 and the rotary cutter 210, 220 for improving the effective reach of the pruning apparatus 100.

In use, the pruning apparatus 100 is mounted to a prime mover such as a tractor so that it can be driven along a row of vine or cane vegetation to be pruned. The toothed wheel 300, 320 mounted at the distal end 412 of the first arm 410 is configured to start at a certain distance from the vegetation depending on the pruning requirement. Vegetation to be pruned is caught between gaps 318 of the toothed wheel 300 and subsequently pruned by the driven cutter 210, 220. When the toothed wheel 300, 320 encounters an obstacle such as a trunk or post, the first arm 410 and the second arm 420 is configured to deflect to accommodate resistance encountered by the toothed wheel 300, 320 such that the obstacle is traversed by way of the toothed wheel 300, 320 gently rolling over the obstacle rather than bumping into or bouncing off the obstacle at speed. This advantageously allows the pruning apparatus 100 to effectively prune vegetation at over twice the speed of conventional pruning machines and reduce damage caused to the vegetation.

Although the pruning apparatus 100 has been described to be applicable for use with vine or cane pruning, it is to be understood that they could be equally suitable for use with other pruning applications.

In the description and drawings of this embodiment, same reference numerals are used as have been used in respect of the first embodiment, to denote and refer to corresponding features.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A vine or cane pruning apparatus, comprising:
   a non-motorized toothed wheel for guiding the pruning apparatus over vegetation in use, the wheel comprising a multiplicity of generally radially projecting teeth distributed about the periphery of the wheel for catching vegetation between gaps of the teeth, and wherein the projecting teeth of the non-motorized toothed wheel engage the vegetation, during use, so as to cause rotation of the non-motorized wheel in a substantially horizontal plane as the apparatus is driven along a row of vines or canes for pruning; and
   a driven rotary cutter mounted co-axially to the wheel for cutting vegetation caught between the teeth, the cutter being configured such that its effective cutting area falls within the diameter of the wheel;
   a displaceable arm assembly for connecting the toothed wheel with a prime mover for driving the apparatus along a row of vines or canes for pruning such that the wheel, mounted to a distal end of the arm assembly, is laterally moveable with respect to the prime mover, wherein:
   the arm assembly is provided with one or more suspension system(s) configured such that the wheel is biased to return to a neutral position with respect to the prime mover from a deflected position after encountering resistance against vegetation and/or post obstacles in use,
   the arm assembly comprises a first arm and a second arm pivotably coupled to the first arm, and a suspension system coupled therebetween such that the first arm is laterally moveable between the biased neutral position and the deflected position, and
   the arm assembly further comprises a third arm pivotably coupled to the second arm, and wherein a second suspension system is coupled therebetween such that the lateral movement of both the first arm and the second arm are effected when the wheel, mounted to a distal end of the first arm, encounters vegetation and/or post obstacles in use for improved traction between the wheel and said obstacles when traversing said obstacles.

2. A pruning apparatus according to claim 1, wherein the arm assembly is provided with one or more actuation mechanism(s) configured such that the wheel can be actuated to move laterally with respect to the prime mover in a forward and/or reverse direction(s).

3. A pruning apparatus according to claim 1, wherein the arm assembly is horizontally and vertically adjustable relative to the prime mover.

4. A pruning apparatus according to claim 1, wherein the teeth of the wheel are configured to have a length which ranges from about 6 cm to about 8 cm.

5. A pruning apparatus according to claim 1, wherein the widest spacing between adjacent teeth of the wheel is configured to be about 2 cm to about 5 cm.

6. A pruning apparatus according to claim 1, wherein the teeth are configured to be in an elongated shape with a rounded distal end for traversing vegetation and/or post obstacles.

7. A pruning apparatus according to claim 1, wherein the rotary cutter is in the form of an elongated cutting blade having cutting edges at and/or near opposite ends of the blade.

8. A pruning apparatus according to claim 1, wherein the cutter is configured such that a tip end of its cutting edge extends between a root of the teeth and a tip end of the teeth.

9. A pruning apparatus according to claim 1, wherein the cutter is mounted about 1 cm above the toothed wheel.

10. A pruning apparatus according to claim 9, further comprising a second like driven rotary cutter mounted adjacent and below the toothed wheel for extending the pruning area of the apparatus.

11. A pruning apparatus according to claim 1, wherein the toothed wheel is a first-defined toothed wheel, and the pruning apparatus further comprises a second like toothed wheel mounted co-axially below the toothed wheel for catching additional vegetation for cutting, wherein the second toothed wheel is configured with a reduced diameter with respect to the first-defined toothed wheel.

12. A pruning apparatus according to claim 1, further comprising an agitator in the form of a rod driven in rotation located below the toothed wheel for agitating vegetation such that they move closer to the toothed wheel and the rotary cutter for pruning.

13. A pruning apparatus according to claim 1, wherein the teeth of the toothed wheel are substantially rigid.

14. A pruning apparatus according to claim 1, in combination with a prime mover for driving the apparatus along a row of vines or canes for pruning.

15. A vine or cane pruning apparatus, comprising:
   a non-motorized toothed wheel for guiding the pruning apparatus over vegetation in use, the wheel comprising a multiplicity of generally radially projecting teeth distributed about the periphery of the wheel for catching vegetation between gaps of the teeth, and wherein the wheel rotates in use by consequence of the wheel's engagement with the vegetation and vine or cane posts as the apparatus is driven along a row of vines or canes for pruning;
   a driven rotary cutter mounted co-axially to the wheel for cutting vegetation caught between the teeth, the cutter being configured such that its effective cutting area falls within the diameter of the wheel;
   a displaceable arm assembly for connecting the toothed wheel with a prime mover for driving the apparatus along a row of vines or canes for pruning such that the wheel, mounted to a distal end of the arm assembly, is laterally moveable with respect to the prime mover, wherein:
the arm assembly is provided with one or more suspension system(s) configured such that the wheel is biased to return to a neutral position with respect to the prime mover from a deflected position after encountering resistance against vegetation and/or post obstacles in use,
the arm assembly comprises a first arm and a second arm pivotably coupled to the first arm, and a suspension system coupled therebetween such that the first arm is laterally moveable between the biased neutral position and the deflected position, and
the arm assembly further comprises a third arm pivotably coupled to the second arm, and wherein a second suspension system is coupled therebetween such that the lateral movement of both the first arm and the second arm are effected when the wheel, mounted to a distal end of the first arm, encounters vegetation and/or post obstacles in use for improved traction between the wheel and said obstacles when traversing said obstacles; and
a second like driven rotary cutter mounted adjacent and below the toothed wheel for extending the pruning area of the apparatus.

\* \* \* \* \*